Dec. 4, 1934. W. H. TABOR 1,982,971
DRIVE COUPLING FOR FLUID PUMPS
Filed June 29, 1933 3 Sheets-Sheet 1

Inventor
William H. Tabor

By Clarence A. O'Brien
Attorney

Dec. 4, 1934.  W. H. TABOR  1,982,971
DRIVE COUPLING FOR FLUID PUMPS
Filed June 29, 1933   3 Sheets-Sheet 2

Inventor
William H. Tabor
By Clarence A. O'Brien
Attorney

Dec. 4, 1934.          W. H. TABOR          1,982,971
DRIVE COUPLING FOR FLUID PUMPS
Filed June 29, 1933          3 Sheets-Sheet 3

Inventor
William H. Tabor

By Clarence A. O'Brien
Attorney

Patented Dec. 4, 1934

1,982,971

UNITED STATES PATENT OFFICE 1,982,971

DRIVE COUPLING FOR FLUID PUMPS

William H. Tabor, Huntington, W. Va., assignor of one-fourth to Frederick H. Baribeau and one-fourth to Elza E. Smith, Huntington, W. Va.

Application June 29, 1933, Serial No. 678,306

1 Claim. (Cl. 172—284)

This invention appertains to new and useful improvements in shaft couplings, and more particularly to means for leak-proofing fluid pumps, by establishing an indirect drive between the driven shaft of the pump and the drive shaft.

The principal object of the present invention is to provide a coupling which imparts motion from a driving to a driven shaft, with a fluid impervious barrier interposed between the drive and driven shafts to eliminate the necessity of glands, bushings and other packing and insure leak-proof performance.

Other important objects and advantages of the invention will become apparent to the reader of the following specification.

In the drawings:—

Figures 1, 6:
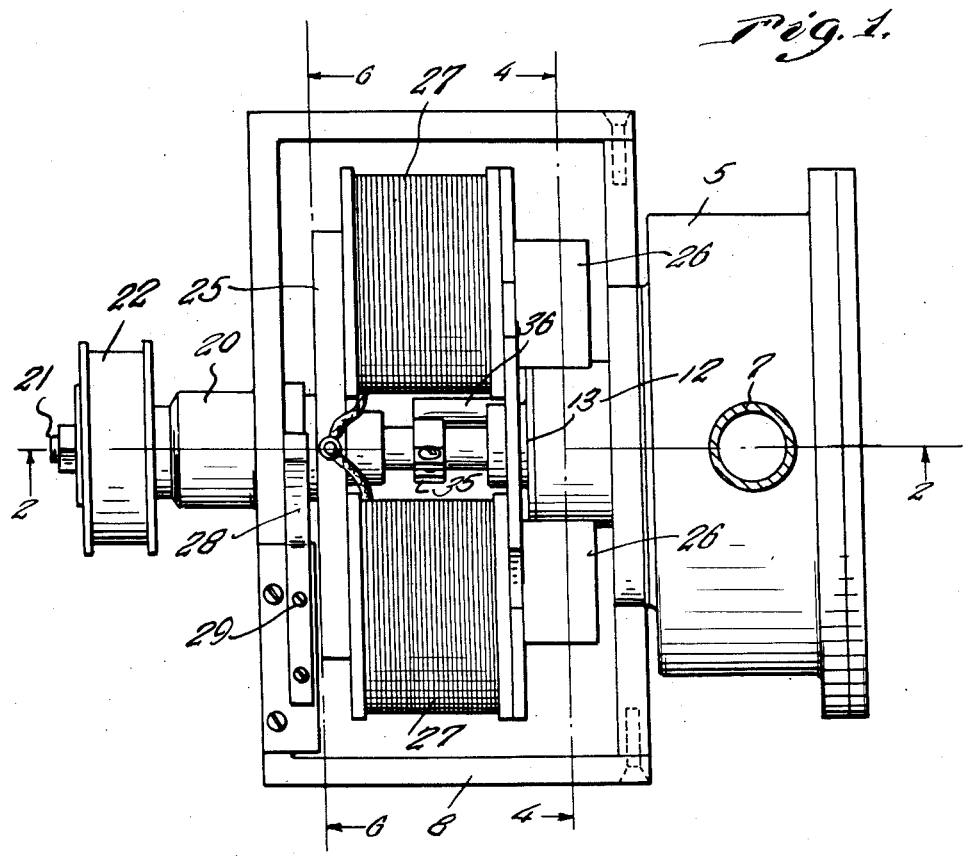
Figure 1 represents a top plan view of the coupling.
Figure 6 represents a sectional view taken substantially on line 6—6 of Figure 1.
Figure 2:
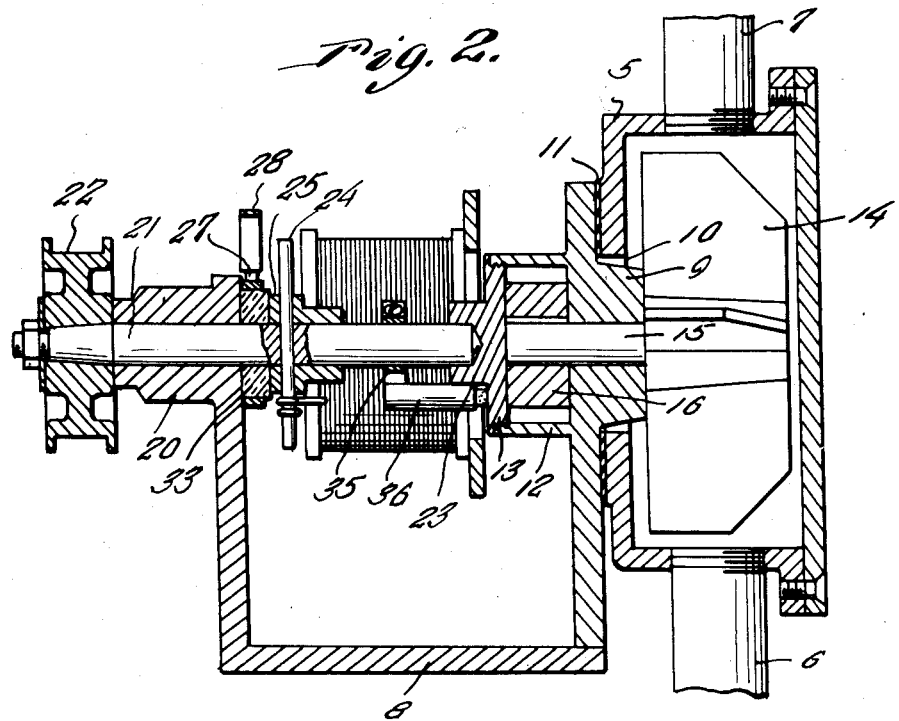
Figure 2 represents a longitudinal vertical sectional view taken substantially on line 2—2 of Figure 1.

Referring to the drawings wherein like numerals designate like parts, it can be seen in Figures 1 and 2 that numeral 5 represents the pump housing with the inlet pipe 6 and the outlet pipe 7 connected thereto.

Figure 4:
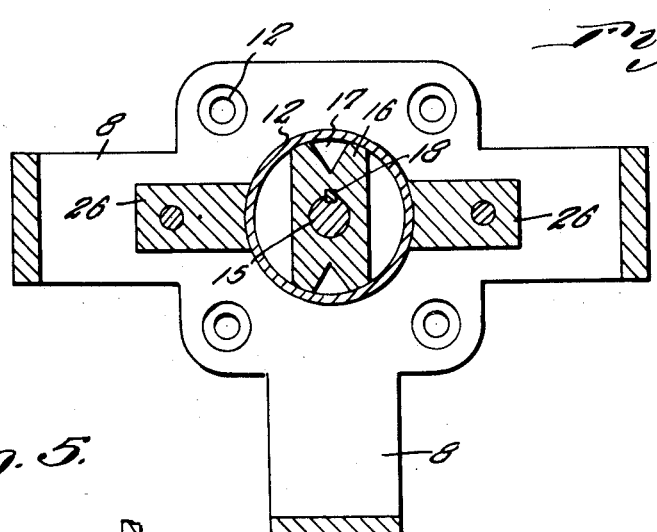
Figure 4 represents a cross sectional view taken substantially on line 4—4 of Figure 1.
Figure 5:
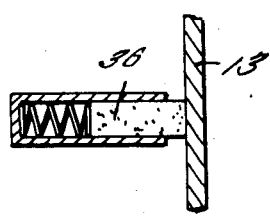
Figure 5 represents a fragmentary detailed sectional view of the carbon brush.

Numeral 8 represents a frame, one end of which is provided with a boss 9 for disposition into the opening 10 in the housing 5 and between this end of the frame 8 and the adjacent side of the housing 5 is interposed some suitable packing means 11. As is apparent in Figure 4, this particular end of the frame 8 is provided with openings 12 through which screws can be disposed for threaded engagement into the housing 5 to support the frame 8 by the housing.

Protruding into the frame 8 from the end wall thereof adjacent the housing 5 is the cylindrical wall 12 of some suitable non-magnetic material having a plug 13 also of non-magnetic metal disposed into its outer end.

As is clearly shown in Figure 2, numeral 14 represents the wheel of the pump which is carried by the driven shaft 15. This shaft extends through the portion 9 of the frame and into the interior of the cylindrical wall 12 where it is equipped with the impeller 16 made of a magnetizable material, the ends of which are grooved, as at 17. The ends of this impeller 16 fit close but barely loose enough to be free to turn against the inner side of the wall 12 and this impeller 16 is suitably keyed, as at 18, to the driven shaft 15.

The opposite end of the frame 8 is provided with a hub structure 20 through which the drive shaft 21 is journaled. The outer end of this shaft 21 is equipped with the usual belt pulley 22, while its inner end bears into the bearing-like extension 23 on the plug 13.

A pin 24 extends through the shaft 21 and also through the cross bar 25, thus securing the bar 25 so that it will rotate with the drive shaft 21. This bar 25 forms the connecting part between the pole pieces 26—26 which are magnetized by the electro-magnetic coils 27—27 at the outer end of the bar 25.

Figure 7:
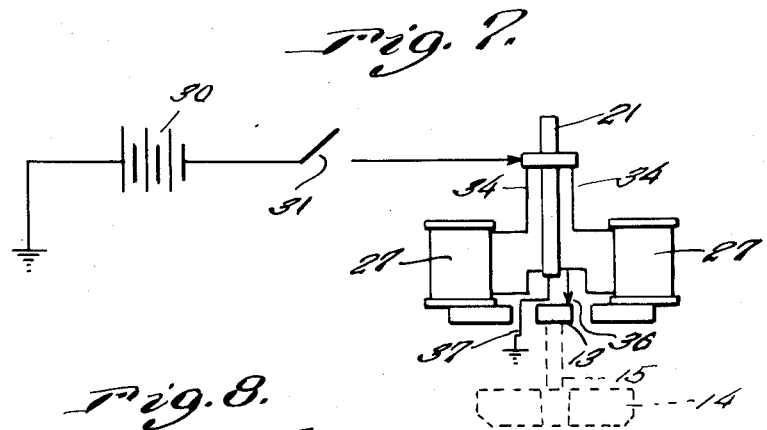
Figure 7 represents a diagrammatic view disclosing the electrical connections between the electrical devices involved.
Figure 8:
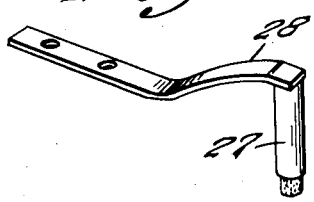
Figure 8 represents a perspective view of the brush shown in Figure 5.
Figure 3:
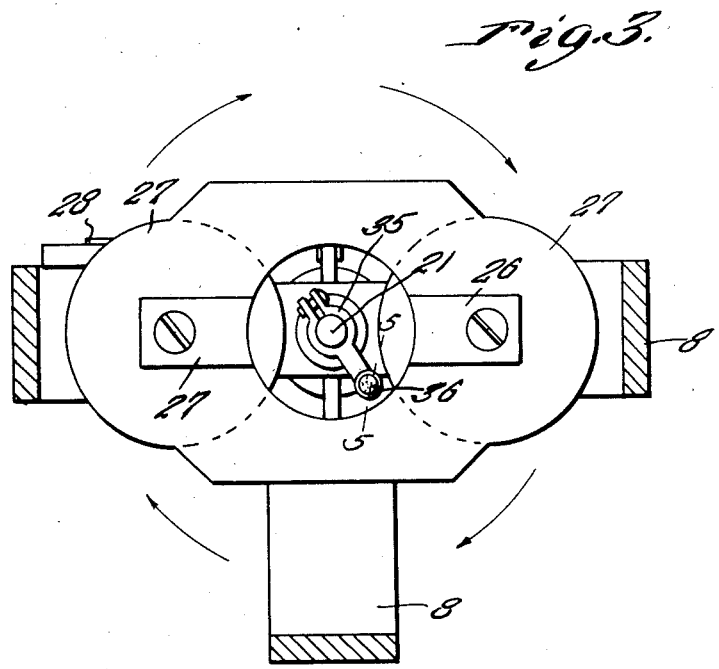
Figure 3 represents a cross sectional view through the structure.

A current supply carbon brush 27' supported by a leaf spring 28 attached, as at 29, to the frame supplies current from the battery 30 by way of the switch 31 to one side of each of the coils 27—27 by way of the connector ring 32. This connector ring 32 circumscribes the dielectric collar 33 on the drive shaft 21 and connections 34 are made from this ring to the coils, as shown in Figure 7. The remaining ends of the coils are connected to the shaft and by suitable clamps 35 the carbon brush 36 is connected to the shaft 21 so that it will wipe against the plug 13. The shaft is supplementally grounded, as at 37 in Figure 7.

Thus it can be seen that as the pulley 22 in rotating drives the drive shaft 21, the magnets 27 will be rotated along with their pole pieces 26. As the pole pieces 26 revolve around the wall 12, the impeller 16 will become aligned therewith, the force of the magnets being exerted through the wall 12, so that the driven shaft 15 and the pump wheel 14 will be revolved in synchronism with the rotation of the drive shaft 21, the only actual connection between the drive shaft and the driven shaft being the magnetic clutch set up by the magnets and their pole pieces 26 in complement with the impeller 16.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

In combination, a pump housing, a frame connected therewith, a cylinder of non-magnetic material carried by the frame, a pump shaft having a part extending into the housing and a part into the cylinder, an impeller located in the housing and connected with the pump shaft, a second impeller of magnetizable material connected with the pump shaft and located in the non-magnetic cylinder, a drive shaft supported by the frame and mechanically independent of the pump shaft, a pair of magnetic field coils carried by the drive shaft, a pair of pole pieces extending from said field coils and forming part of the cores thereof, said pole pieces being disposed laterally of the cylinder and in close proximity therewith whereby as the pole pieces rotate around the cylinder with the drive shaft and coils, the magnetism thereof will influence the second impeller to rotate the pump shaft.

WILLIAM H. TABOR.